United States Patent [19]

Okada et al.

[11] Patent Number: 4,741,861
[45] Date of Patent: May 3, 1988

[54] SILICONE-BASED ANTIFOAM COMPOSITION AND A METHOD FOR THE PREPARATION OF THE SAME

[75] Inventors: Fumio Okada; Nobuyuki Terae; Kiyohiro Kondou, all of Gunma, Japan

[73] Assignee: Shin-Etsu Chemical Co., Ltd., Tokyo, Japan

[21] Appl. No.: 830,568

[22] Filed: Feb. 18, 1986

[30] Foreign Application Priority Data

Feb. 25, 1985 [JP] Japan .................................. 60-36043

[51] Int. Cl.$^4$ .............................................. B01D 17/05
[52] U.S. Cl. ...................................... 252/358; 252/321
[58] Field of Search ................................. 252/358, 321

[56] References Cited

U.S. PATENT DOCUMENTS

| | | | |
|---|---|---|---|
| 4,122,029 | 10/1978 | Gee | 252/358 X |
| 4,145,308 | 3/1979 | Simoneau | 252/358 X |
| 4,338,217 | 7/1982 | Pirson | 252/358 X |
| 4,370,160 | 1/1983 | Ziemelis | 252/358 |
| 4,405,490 | 9/1983 | Maas | 252/358 |
| 4,486,336 | 12/1984 | Pape | 252/358 X |
| 4,514,319 | 4/1985 | Kulkarni | 252/321 |
| 4,639,489 | 1/1987 | Aizawa | 252/358 X |

Primary Examiner—John F. Terapane
Assistant Examiner—Catherine S. Kilby
Attorney, Agent, or Firm—Jules E. Goldberg

[57] ABSTRACT

The silicone-based antifoam composition having excellent durability of the antifoam activity even under vigorous agitation or under an alkaline condition comprises three kinds of diorganopolysiloxanes, of which the first is free from aliphatic unsaturation, the second is terminated at both molecular chain ends each with a vinyl diorganosilyl group and the third is terminated at both molecular chain ends each with a diorganosilyl group having a silicon-bonded hydrogen atom, a finely divided silica powder, a platinum compound to catalyze the addition reaction between the silicon-bonded vinyl groups and silicon-bonded hydrogen atoms in the second and the third diorganopolysiloxanes, respectively, and an organosilane compound of the formula $R^1{}_aY_bSi$, in which $R^1$ is a monovalent hydrocarbon group, Y is a hydroxy, carboxyl or hydrolyzable group and a and b are each 1, 2 or 3 with the proviso that $a+b=4$. When the composition, which is in the form of an aqueous emulsion or a dispersion in an organic solvent, is heated at an elevated temperature, the addition reaction takes place between the second and the third diorganopolysiloxanes to increase the stability and antifoam activity of the composition.

5 Claims, No Drawings

SILICONE-BASED ANTIFOAM COMPOSITION AND A METHOD FOR THE PREPARATION OF THE SAME

BACKGROUND OF THE INVENTION

The present invention relates to a silicone-based antifoam composition or, more particularly, to a silicone-based antifoam composition readily emulsifiable with good dispersibility in water or dispersible in organic solvents and capable of durably maintaining the antifoam activity without decrease over a long period of time even under vigorous agitation or under an alkaline condition as well as a method for the preparation thereof.

Among various types of antifoam compositions, as is well known, silicone-based antifoam compositions comprising a dimethyl polysiloxane as the principal ingredient are widely used, by virtue of their excellent properties or performance in comparison with those of other types, as an agent for breaking or suppressing rising foams in a variety of industrial fields including chemical industry, food industry, petroleum industry, textile industry and the like. A problem in the use of a silicone-based antifoam composition in general is the relatively poor durability of the antifoam activity and, in particular, the antifoam performance thereof is rapidly lost under an alkaline condition or under vigorous agitation as is the case in the jet dyeing of textiles and in the aeration tank for sewage disposal.

Accordingly, various attempts and proposals have been made including a method described in Japanese Patent Publication No. 52-31836, in which the finely divided silica powder formulated in conventional silicone-based antifoam compositions is rendered hydrophobic in advance by the treatment with dimethyl dichlorosilane and the like, and a method described in Japanese Patent Publication No. 51-35556, in which the silica powder is treated with a nitrogen-containing organosilicon compound. These methods of the hydrophobic treatment of the silica powder, however, are economically not advantageous due to the long time taken for the treatment and the necessity of installing special facilities therefor. Alternatively, a silicone-based antifoam composition is proposed in Japanese Patent Kokai No. 57-48307, which is prepared by admixing an organopolysiloxane with an organohydrogenpolysiloxane, a silica powder and a catalyst. The antifoam compositions of this type are disadvantageous due to the danger of possible fire and explosion since hydrogen gas is evolved from the composition during use in addition to the not always satisfactory durability of the antifoam activity thereof.

It is also known that the durability of the antifoam activity of a silicone-based antifoam composition can be improved when the composition is prepared by using a high-molecular silicone fluid having an increased viscosity. The disadvantage in the compositions of this type is the difficulty in handling and emulsification thereof due to their high consistency. Although such a composition can be used in some applications in the form of a dispersion in an organic solvent such as hydrocarbons, a danger of fire is unavoidable in such a solvent-containing composition and the field of applicability thereof is limited to non-aqueous foaming liquids.

SUMMARY OF THE INVENTION

Thus, the silicone-based antifoam composition of the invention, of which the above described problems and disadvantages in the conventional silicone-based antifoam compositions in the prior art are dissolved, comprises:

(A) 100 parts by weight of a combination of diorganopolysiloxanes composed of (A-a) from 98 to 20% by weight of a diorganopolysiloxane having no aliphatic unsaturation terminated at both molecular chain ends each with a triorganosilyl group and having a viscosity in the range from 5 to 2000 centistokes at 25° C., (A-b) from 1 to 60% by weight of a diorganopolysiloxane terminated at both molecular chain ends each with a vinyl diorganosilyl group and having a viscosity in the range from 20 to 5000 centistokes at 25° C. and (A-c) from 1 to 60% by weight of a diorganopolysiloxane terminated at both molecular chain ends with a diorganohydrogensilyl group and having a viscosity in the range from 20 to 1000 centistokes at 25° C.;

(B) from 0.1 to 40 parts by weight of an organosilane compound represented by the general formula $R^1_a Y_b Si$, in which $R^1$ is a substituted or unsubstituted monovalent hydrocarbon group having 1 to 20 carbon atoms, Y is a group selected from the class consisting of hydroxy group, alkoxy groups having 1 to 6 carbon atoms, acyloxy groups, alkenyloxy groups and carboxyl group, and the subscripts a and b are each a positive integer of 1, 2 or 3 with the proviso that $a+b$ is equal to 4;

(C) from 1 to 40 parts by weight of a finely divided silica powder; and (D) a catalytic amount of a platinum compound.

The inventive antifoam composition comprising the above described components (A) to (D) is emulsified in an aqueous medium or dispersed in an organic solvent and the emulsion or dispersion should be subjected to a heat treatment at a temperature in the range from 40° to 150° C. prior to use.

DETAILED DESCRIPTION OF THE PREFERRED EMBODIMENTS

The above described formulation of the inventive antifoam composition has been established as a result of the extensive investigations undertaken by the inventors with an object to obtain a silicone-based antifoam composition capable of being readily emulsified in an aqueous medium or dispersed in an organic solvent and exhibiting high and durable antifoam activity even under vigorous agitation or under an alkaline condition.

The idea which has led to the above described formulation of a readily emulsifiable or readily dispersible silicone-based antifoam composition is the use of a diorganopolysiloxane of a relatively low viscosity, which can readily be emulsified in an aqueous medium or readily dispersed in an organic solvent, and increase of the molecular weight of the low-viscosity diorganopolysiloxane after the emulsification or dispersion thereof by the addition reaction so that the resultant antifoam composition in the form of an aqueous emulsion or dispersion in an organic solvent may exhibit antifoam activity as high as that of the composition prepared of a high-viscosity diorganopolysiloxane.

Further, the combined addition of the organosilane compound as the component (B) and the finely divided silica powder as the component (C) is effective to increase the durability of the antifoam activity of the composition presumably due to the increased affinity of the silica surface to the diorganopolysiloxane as a result of the interaction of the organosilane compound to the silica surface. The interaction of the organosilane compound to the silica surface is also effective to improve the emulsifiability in water or dispersibility in organic solvents of the composition so that the durability of the antifoam activity can be improved so much.

The component (A) comprised in the inventive silicone-based antifoam composition is a combination of three kinds of diorganopolysiloxanes (A-a), (A-b) and (A-c), of which the diorganopolysiloxane (A-a) has no aliphatic unsaturation and is terminated at both molecular chain ends each with a triorganosilyl or trihydrocarbyl group. The diorganopolysilox-ane (A-a) is expressed by the average unit formula $R^2_c SiO_{(4-c)/2}$, in which $R^2$ is a substituted or unsubstituted monovalent hydrocarbon group having 1 to 20 carbon atoms free from aliphatic unsaturation and the subscript c has a value in the range from 1.9 to 2.1. The group denoted by $R^2$ is exemplified by alkyl groups, e.g. methyl, ethyl, propyl and butyl groups and aryl groups, e.g. phenyl and tolyl groups, as well as those substituted groups obtained by replacing a part or all of the hydrogen atoms in the above named hydrocarbon groups with substituents such as halogen atoms, cyano groups and the like exemplified by chloromethyl, 3,3,3-trifluoropropyl and cyanopropyl groups. Particular examples of the diorgapolysiloxane include dimethyl polysiloxanes, diethyl polysiloxanes, methyl phenyl polysiloxanes, copolymeric dimethyl diphenyl polysiloxanes, methyl 3,3,3-trifluoropropyl polysiloxanes, dimethyl chloropropylmethyl polysiloxanes and the like, of which dimethyl polysiloxane fluids are particularly preferred in view of the high antifoam activity and inexpensiveness.

Further, the diorganopolysiloxane (A-a) of the component (A) serves as a dispersing medium of the reaction product formed by the addition reaction between the diorganopolysiloxanes (A-b) and (A-c) described below. In this regard, the diorganopolysiloxane (A-a) should have a relatively low viscosity in the range from 5 to 2000 centistokes at 25° C. in order that the inventive antifoam composition may have good workability and high dispersing power for the above mentioned reaction product. The amount of the diorganopolysiloxane (A-a) is specified relative to the amount of the total amount of the three kinds of the diorganopolysiloxanes (A-a), (A-b) and (A-c) and should be in the range from 98 to 20% by weight based on the total amount of (A-a) to (A-c). When the amount of the component (A-a) is too large relative to the other two diorganopolysiloxanes, the antifoam composition cannot exhibit antifoam activity having durability as desired. When the amount thereof is too small, on the other hand, the consistency of the composition may be too high after the addition reaction has taken place between the diorganopolysiloxanes (A-b) and (A-c) so that the composition is disadvantageous in respect of the poor workability.

The component (A-b) comprised in the inventive antifoam composition is also a diorganopolysiloxane but it is characteristically terminated at both molecular chain ends each with a vinyl diorganosilyl group to be differentiated from the diorganopolysiloxane (A-a). The diorganopolysiloxane (A-b), for example, is represented by the general formula $$Vi-SiR^3_2-O+SiR^3_2-O\!\!\!\!\!\!)_{\overline{m}}SiR^3_2-Vi,$$

in which Vi is a vinyl group, $R^3$ is a substituted or unsubstituted monovalent hydrocarbon group having no aliphatic unsaturation exemplified by alkyl groups, e.g. methyl, ethyl and propyl groups, and aryl groups, e.g. phenyl and tolyl groups, as well as those substituted groups obtained by replacing a part or all of the hydrogen atoms in the above named hydrocarbon groups with substituents such as halogen atoms and the subscript m is a positive integer. The diorganopolysiloxane having a linear molecular structure shown above should have a viscosity in the range from 20 to 5000 centistokes at 25° C. When the viscosity or degree of polymerization thereof is too small, the reaction product thereof with the diorganopolysiloxane (A-c) described below cannot have a sufficiently high molecular weight so that no sufficiently durable antifoam activity cannot be exhibited by the resultant antifoam composition. When the viscosity of the diorganopolysiloxane (A-b) is too high, on the other hand, the miscibility thereof with the diorganopolysiloxane (A-c) is poor to disturb the addition reaction therebetween in addition to the disadvantage of the difficulty in the emulsification of the composition. The amount of the diorganopolysiloxane (A-b) in the inventive antifoam composition should be in the range from 1 to 60% by weight based on the total amount of the three diorganopolysiloxanes (A-a), (A-b) and (A-c). When the amount thereof is too small, the antifoam composition may have no antifoam activity with sufficient durability. When the amount thereof is too large, on the other hand, the antifoam composition may be imparted with an unduly increased viscosity or consistency to cause a problem in the workability of the composition.

The component (A-c) comprised in the inventive antifoam composition is again a diorganopolysiloxane but it is characteristically terminated at both molecular chain ends each with a hydrogen diorganosilyl group to be differentiated from the diorganopolysilocanes (A-a) and (A-b) in this regard. For example, it is represented by the general structural formula $$H-SiR^3_2-O+SiR^3_2-O\!\!\!\!\!\!)_{\overline{n}}SiR^3_2-H,$$

in which $R^3$ has the same meaning as defined above and the subscript n is a positive integer. The viscosity of the diorganopolysiloxane having a substantially linear molecular structure shown by the above given formula should be in the range from 20 to 1000 centistokes at 25° C. for the same reasons as in the viscosity limitation for the diorganopolysiloxane (A-b). The amount of the diorganopolysiloxane (A-c) should also be in the range from 1 to 60% by weight based on the total amount of the three diorganopolysiloxanes (A-a) to (A-c) also for the same reasons as in the limitation of the amount of the diorganopolysiloxane (A-b).

The component (B) comprised in the inventive antifoam composition is an organosilane compound represented by the general formula $R^1_a Y_b Si$, in which each of the symbols $R^1$, Y, a and b has the meaning as defined before. The symbols $R^1$ denotes a substituted or unsubstituted monovalent hydrocarbon group having 1 to 20 carbon atoms exemplified by alkyl groups, e.g. methyl, ethyl, propyl and butyl groups, cycloalkyl groups, e.g. cyclohexyl and cyclopentyl groups, alkenyl groups, e.g. vinyl and allyl groups, and aryl groups, e.g. phenyl and tolyl groups, as well as those substituted groups obtained by replacing a part or all of the hydrogen atoms in the above named hydrocarbon groups with substituents such as halogen atoms, e.g. chloromethyl, chloropropyl, chlorophenyl, tetrachlorophenyl, 3,3,3-trifluoropropyl and 2-(perfluorohexyl)ethyl groups. The symbol Y denotes a functional group selected from the class consisting of hydroxy group, alkoxy groups having 1 to 6 carbon atoms, acyloxy groups, alkenyloxy groups and carboxyl group. Particular examples thereof other than hydroxy and carboxyl groups include methoxy, ethoxy, propoxy, butoxy, acetoxy and propenyloxy groups. The subscripts a and b are each a positive integer of 1, 2 or 3 with the proviso that a+b is equal to 4. Particular examples of the organosilane compound in conformity with the above described definition of the component (B) are those expressed by the following structural formulas, in which the symbols Me, Et, Ph, Vi and Oc each denote methyl, ethyl, phenyl, vinyl and octyl groups, respectively:
MeSi(—O—Me)$_3$; MeSi(—O—Et)$_3$; MeSi(—O—CO—Me)$_3$; Me$_2$Si(—O—Me)$_2$; Me$_2$Si(—O—Et)$_2$; MeSi(—O—CMe=CH$_2$)$_3$; Me$_2$Si(—O—CO—Me)$_2$; (Ph—CH$_2$CH$_2$—)$_2$Si(OH)$_2$; MeSi(OH)$_3$; Me$_2$Si(OH)$_2$; Ph—CH$_2$CH$_2$—Si(O—Me)$_3$; ViSi(—O—Me)$_3$; CH$_2$Cl—CH$_2$CH$_2$—Si(—O—Me)$_3$; ViSi(—O—CH$_2$CH$_2$—O—Me)$_3$; CF$_3$CH$_2$CH$_2$—Si(—O—Me)$_3$; C$_4$F$_9$—CH$_2$CH$_2$—Si(OH)$_3$; (C$_4$F$_9$—CH$_2$CH$_2$—)$_2$Si(—O—Me)$_2$; OcSi(—O—Me)$_3$; Et$_3$SiOH; and Oc$_2$Si(—O—CO—Et)$_2$.

The amount of the organosilane compound as the component (B) in the inventive antifoam composition should be in the range from 0.1 to 40 parts by weight or, preferably, from 0.3 to 10 parts by weight per 100 parts by weight of the total amount of the diorganopoysiloxanes (A-a), (A-b) and (A-c). When the amount thereof is too small, the desired advantages in the inventive antifoam composition cannot be obtained as a matter of course. When the amount thereof is too large, on the other hand, the antifoam activity of the composition is rather decreased with the increase of the amount over the above mentioned upper limit.

The component (C) comprised in the inventive antifoam composition is a finely divided silica powder which may be any of those known as a silica filler manufactured in a dry process or wet process including precipitated silica fillers, silica xerogels and fumed silica fillers as well as those surface-treated silica fillers having the silanolic hydroxy groups on the surface of these silica fillers blocked with organosilyl groups. Various commercial products of silica fillers usable in the invention include Aerosils (products by Nippon Aerosil Co.), Nipsils (products by Nippon Silica Co.), Cab-o-Sils (products by Cabot Inc.) and Santocels (products by Monsanto Chemical Co.). The finely divided silica powder should preferably have a specific surface area of at least 50 m$^2$/g as determined by the so-called BET method. The amount of the finely divided silica powder as the component (C) in the inventive antifoam composition should preferably be in the range from 1 to 40 parts by weight or, more preferably, from 3 to 20 parts by weight per 100 parts by weight of the total amount of the three kinds of diorganopolysiloxanes (A-a), (A-b) and (A-c). When the amount of the silica powder is smaller than the above mentioned lower limit, the antifoam activity of the composition cannot be so high as desired. When the amount thereof is too large, on the other hand, the antifoam composition may have an unduly high consistency with difficulty in handling and poor workability.

The component (D) comprised in the inventive antifoam composition is a platinum compound which serves as a catalyst to promote the addition reaction between the diorganopolysiloxanes (A-b) and (A-c). Various kinds of platinum compounds known in the prior art can be used in the inventive composition including chloroplatinic acid, complexes of chloroplatinic acid with an alcohol or aldehyde compound and complexes of chloroplatinic acid with an olefinic compound. Platinum black and solid platinum catalysts supported on a carrier of silica, alumina and the like can also be used in some cases. The amount of the platinum catalyst as the component (D) is a so-called catalytic amount and should be determined according to the desired velocity of the addition reaction. It is, however, usually at least 0.1 ppm or, preferably, from 1 to 30 ppm by weight based on the total amount of the three kinds of the diorganopolysiloxanes (A-a), (A-b) and (A-c).

The silicone-based antifoam composition of the present invention can be prepared by uniformly blending the above described components (A), i.e. diorganopolysiloxanes (A-a) to (A-c), to (D) according to the specified formulation described above. It is a preferable condition in the formulation that the diorganopolysiloxanes (A-b) and (A-c) are taken in such a proportion that the molar ratio of the vinyl groups directly bonded to the silicon atoms in the diorganopolysiloxane (A-b) to the hydrogen atoms directly bonded to the silicon atoms in the diorganopopolysiloxane (A-c) is in the range from 4:1 to 1:4. Further, the inventive composition should preferably have a viscosity in the range from 20 to 10,000 centistokes at 25° C. from the standpoint of obtaining good dispersibility and emulsifiability of the composition.

The antifoam composition of the invention can be used as such by adding to a foaming liquid. It is, however, a preferable way in order to obtain full durability of the antifoam activity that the inventive composition is added to the foaming liquid in the form of an emulsion prepared by the emulsification thereof in an aqueous medium by use of a suitable surface active agent followed by a heart treatment at 40° to 90° C. for 2 to 120 minutes. The surface active agent usable in this case is exemplified by sorbitan fatty acid esters, glycerin fatty acid esters, propylene glycol fatty acid esters, polyoxyethylene fatty acid esters, polyoxyethylene sorbitan fatty acid esters, polyoxyethylene alkyl ethers, block copolymers of ethylene oxide and propylene oxide and the like though not particularly limited thereto. The aqueous emulsion may further be admixed according to need with a water-soluble polymer such as methyl cellulose, polyvinyl alcohol, sodium alginate, fatty acid esters of sucrose, hydroxypropyl methyl cellulose, carboxymethyl cellulose and the like with an object to have them serving as a protective colloid, thickening agent and/or stability improver in the emulsification for the preparation of an emulsion-type antifoam composition.

Alternatively, the inventive antifoam composition can be used as a dispersion in an organic solvent having been subjected to a heat treatment at a temperature of 40° to 150° C. for 10 to 600 seconds. The organic solvents usable in this case are exemplified by aliphatic hydrocarbon solvents, aromatic hydrocarbon solvents, chlorinated hydrocarbon solvents, ether solvents and alcoholic solvents. The amount of the organic solvent should be in the range from 40 to 90% by weight or, preferably, from 50 to 70% by weight based on the antifoam composition composed of the components (A) to (D).

In the following, the silicone-based antifoam composition of the invention is illustrated in more detail by way of examples, in which the values of viscosity always refer to the viscosity measured at 25° C. and the expression of "parts" always refers to "parts by weight". The Examples are preceded by a description of the testing procedures for the evaluation of the durability of the antifoam activity of the antifoam compositions, of which the results are given in the Examples.

Testing procedure for the durability of the antifoam activity: into a graduated glass cylinder of 1000 ml capacity were taken 100 g of a 0.2% aqueous solution of sodium oleate which was admixed with an aqueous solution of sodium hydroxide so as to have a pH of about 11 and then with a prescribed amount of the antifoam composition. Thereafter, air was continuously blown into the solution in the glass cylinder at a rate of 1 liter/minute through a sintered glass frit ball and the change of the surface level of the foams on the foaming solution was recorded in the lapse of time.

Testing procedure for the antifoam activity under an alkaline condition: into a cylindrical glass vessel having an inner diameter of 140 mm and a depth of 250 mm were taken 1000 g of a 0.03% aqueous solution of a sodium polyoxyethylene alkylphenol sulfate which was admixed with an aqueous solution of sodium hydroxide so as to have a pH of about 13 and then with a prescribed amount of the antifoam composition. Thereafter, the foaming solution in the vessel was circulated through an outer pipeline circuit at a flow rate of 1.8 liters/minute simultaneously with continuous blowing of air thereinto at a rate of 1 liter/minute through a sintered glass frit ball and the change of the surface level of the rising foams on the foaming solution was recorded in the lapse of time.

EXAMPLES 1 AND 2 AND COMPARATIVE EXAMPLES 1 AND 2

Two antifoam compositions A and B for Examples 1 and 2, respectively, were prepared each by uniformly blending:

(A-a) a dimethylpolysiloxame terminated at both molecular chain ends each with a trimethylsilyl group and having a viscosity of 100 centistokes, which is referred to as Siloxane I hereinbelow;

(A-b) a dimethylpolysiloxane terminated at both molecular chain ends each with a vinyl dimethylsilyl group and having a viscosity of 600 centistokes, which is referred to as Siloxane II hereinbelow; and (A-c) a dimethylpolysiloxane terminated at both molecular chain ends each with a dimethylsilyl group and having a viscosity of 40 centistokes, which is referred to as Siloxane III hereinbelow;

each in an amount indicated in Table 1 below together with (B) 8 parts of a finely divided silica powder having a specific surface area of 177 $m^2/g$ (Nipsil LP, a product by Nippon Silica Co.);

(C) 2 parts of an organosilane compound mentioned below; and (D) a platinum catalyst mentioned below in an amount indicated in Table 1.

The organosilane compound was dimethyl dimethoxy silane or trimethyl silanol and the platinum catalyst was a isopropyl alcohol solution of chloroplatinic acid containing 2% by weight of platinum or an olefin complex of chloroplatinic acid in the antifoam compositions A and B, respectively.

Each 10 parts of the thus prepared compositions A and B were emulsified in 85 parts of water containing 2 parts of a sorbitan fatty acid ester (Rheodol SO-10, a product by Kao Co.) and 3 parts of a polyoxyethylene sorbitan fatty acid ester (Rheodol TS-120, a product by the same company supra) by agitating for 20 minutes using a homomixer and the thus obtained aqueous emulsion was heated under agitation for 10 minutes at 60° to 70° C. using a homomixer to give emulsion-type antifoam compositions A and B.

Separately, each 20 parts of the compositions A and B were admixed with 80 parts of mineral spirit and uniformly dispersed therein with agitation followed by heating at 100° C. for 10 minutes to give dispersion-type antifoam compositions A and B.

In Comparative Examples 1 and 2 undertaken for comparative purpose, compositions C and D were prepared in the same formulation as in the composition A excepting the omission of the Siloxanes II and III in composition C and Siloxane III in composition D with increase of the amounts of the other diorganopolysiloxane or dimethylpolysiloxanes as indicated in Table 1. Emulsion-type antifoam compositions C and D and dispersion-type antifoam compositions C and D were prepared in the same manner as in the preparation of the respectivve compositions A and B.

TABLE 1

| Composition | A | B | C | D |
|---|---|---|---|---|
| Siloxane I, parts | 43 | 43 | 90 | 40 |
| Siloxane II, parts | 4 | 4 | — | 50 |
| Siloxane III, parts | 43 | 43 | — | — |
| Platinum catalyst, ppm* | 30 | 20 | 20 | 20 |

*Based on the total amount of the other components

The emulsion-type and dispersion-type antifoam compositions A, B, C, and D were each subjected to the test of the durability of antifoam activity to give the results shown in Table 2 by the volume of foams in ml. The amount of the antifoam composition added to the foaming liquid was 1000 ppm by weight for the emulsion-type antifoam compositions and 500 ppm by weight of the dispersion-type antifoam compositions.

EXAMPLES 3 AND 4 AND COMPARATIVE EXAMPLE 3

Antifoam compositions E and F for Examples 3 and 4, respectively, were prepared each by uniformly blending:

(A-a) a copolymeric dimethyl diphenyl polysiloxane composed of 90% by moles of dimethyl siloxane units and 10% by moles of diphenyl siloxane units with trimethylsilyl groups at both molecular chain ends and having a viscosity of 80 centistokes, which is referred to as Siloxane IV hereinbelow;

(A-b) a dimethylpolysiloxane terminated at both molecular chain ends each with a vinyl dimethyl silyl group and having a viscosity of 100 centistokes, which is referred to as Siloxane V hereinbelow; and

TABLE 2

| | | \multicolumn{6}{c}{Foam volume, ml Length of air blowing time, minutes} |
| --- | --- | --- | --- | --- | --- | --- | --- |
| | | 5 | 10 | 15 | 20 | 25 | 30 |
| Emulsion-type antifoam composition | A | 180 | 180 | 190 | 200 | 210 | 230 |
| | B | 160 | 165 | 165 | 170 | 170 | 180 |
| | C | * | — | — | — | — | — |
| | D | 385 | 600 | * | — | — | — |
| Dispersion-type antifoam composition | A | 160 | 170 | 190 | 210 | 250 | 300 |
| | B | 160 | 165 | 180 | 200 | 210 | 220 |
| | C | * | — | — | — | — | — |
| | D | 660 | 920 | * | — | — | — |

*more than 1000 ml (A-c) a copolymeric diphenyl dimethyl polysiloxane composed of 95% by moles of dimethyl siloxane units and 5% by moles of diphenyl siloxane units with dimethyl silyl groups at both molecular chain ends and having a viscosity of 50 centistokes, which is referred to as Siloxane VI hereinbelow; each in an amount indicated in Table 3 below together with 8 parts of a finely divided fumed silica filler having a specific surface area of 200 m$^2$/g (Aerosil 200, a product by Nippon Aerosil Co.) as the component (C), 2 parts of phenyl trimethoxy silane in composition E or ethyl triacetoxy silane in composition F as the component (B) and 20 ppm of an olefin complex of chloroplatinic acid based on the total amount of the Siloxanes IV, V and VI as the component (D).

In Comparative Example 3, another antifoam composition G was prepared with the same formulation as in the composition E with omission of the Siloxane V, the amounts of the Siloxanes IV and VI being modified as indicated in Table 3. Based on these compositions E, F and G, emulsion-type and dispersion-type antifoam compositions E, F and G were prepared each in the same manner as in the preparation of the emulsion-type and dispersion-type compositions A in Example 1 and subjected to the durability test of the antifoam activity to give the results shown in Table 4. The amount of the antifoam composition added to the foaming liquid was 1000 ppm for the emulsion-type ones and 500 ppm by weight for the dispersion-type ones.

TABLE 3

| Composition | E | F | G |
| --- | --- | --- | --- |
| Siloxane IV, parts | 30 | 45 | 40 |
| Siloxane V, parts | 10 | 15 | — |
| Siloxane VI, parts | 50 | 30 | 50 |

TABLE 4

| | | \multicolumn{6}{c}{Foam volume, ml Length of air blowing time, minutes} |
| --- | --- | --- | --- | --- | --- | --- | --- |
| | | 5 | 10 | 15 | 20 | 25 | 30 |
| Emulsion-type antifoam composition | E | 200 | 230 | 270 | 330 | 400 | 440 |
| | F | 175 | 200 | 235 | 290 | 330 | 390 |
| | G | 450 | * | — | — | — | — |
| Dispersion-type antifoam composition | E | 170 | 200 | 240 | 300 | 330 | 360 |
| | F | 180 | 195 | 220 | 250 | 280 | 320 |
| | G | * | — | — | — | — | — |

*more than 1000 ml

EXAMPLE 5

The emulsion-type antifoam compositions A to G were subjected to the test of the antifoam activity under the alkaline conditions described before to give the results shown in Table 5. The amount of the antifoam composition added to the foaming liquid was 100 ppm in each test. The circulation of the foaming liquid through the external pipeline circuit was interrupted for two minutes after 10 minutes of first period of continued circulation and then resumed and continued for a second 5 minutes period. The results are given in Table 5 by the height of the rising foam layer in cm on the foaming liquid.

TABLE 5

| | | \multicolumn{5}{c}{Height of rising foams, cm Length of air blowing time, minutes} |
| --- | --- | --- | --- | --- | --- | --- |
| | | \multicolumn{3}{c}{Before interruption} | \multicolumn{2}{c}{After interruption} |
| | | 1 | 5 | 10 | 1 | 5 |
| Emulsion-type antifoam composition | A | 0.2 | 0.2 | 0.2 | 0.7 | 2.8 |
| | B | 0.2 | 0.2 | 0.2 | 0.4 | 1.3 |
| | C | 0.2 | 0.4 | 5.0 | 7.0 | 11.0 |
| | D | 0.2 | 0.5 | 3.2 | 4.8 | 8.0 |
| | E | 0.2 | 0.3 | 0.8 | 1.0 | 2.9 |
| | F | 0.2 | 0.2 | 0.5 | 0.7 | 2.7 |
| | G | 0.2 | 0.3 | 4.5 | 5.0 | 9.6 |

What is claimed is:
1. A silicone-based antifoam composition which comprises:
(A) 100 parts by weight of a combination of diorganopolysiloxanes composed of
(A-a) from 98 to 20% by weight of a diorganopolysiloxane having a viscosity in the range from 5 to 2000 centistokes at 25° C. and terminated at both molecular chain ends each with a triorganosilyl group and free from aliphatic unsaturation,
(A-b) from 1 to 60% by weight of a diorganopolysiloxane having a viscosity in the range from 20 to 5000 centistokes at 25° C. and terminated at both molecular chain ends each with a vinyl diorganosilyl group, and
(A-c) from 1 to 60% by weight of a diorganopolysiloxane having a viscosity in the range from 20 to 1000 centistokes at 25° C. and terminated at both molecular chain ends each with a diorganosilyl group;
(B) from 0.1 to 40 parts by weight of an organosilane compound represented by the general formula $R^1_a Y_b Si$, in which $R^1$ is a substituted or unsubstituted monovalent hydrocarbon group having 1 to 20 carbon atoms, Y is a group selected from the class consisting of hydroxy group, alkoxy groups having 1 to 6 carbon atoms acyloxy groups, alkenyloxy groups and carboxyl group, and the subscripts a and b are each a positive integer of 1, 2 or 3 with the proviso that a+b is equal to 4:
(C) from 1 to 40 parts by weight of a finely divided silica powder; and
(D) a catalytic amount of a platinum compound.
2. A silicone-based antifoam composition comprising
(A) 100 parts by weight of a combination of diorganopolysiloxanes composed of
(A-a) from 98 to 20% by weight of a diorganopolysiloxane having a viscosity in the range from 5 to 2000 centistokes at 25° C. and terminated at both molecular chain ends each with a triorganosilyl group and free from aliphatic unsaturation,
(A-b) from 1 to 60% by weight of a diorganopolysiloxane having a viscosity in the range from 20 to 5000 centistokes at 25° C. and termi- nated at both molecular chain ends each with a vinyl diorganosilyl group, and (A-c) from 1 to 60% by weight of a diorganopolysiloxane having a viscosity in the range from 20 to 1000 centistokes at 25° C. and terminated at both molecular chain ends each with a diorganosilyl group;

(B) from 0.1 to 40 parts by weight of an organosilane compound represented by the general formula $R^1_a Y_b Si$, in which $R^1$ is a substituted or unsubstituted monovalent hydrocarbon group having 1 to 20 carbon atoms, Y is a group selected from the class consisting of hydroxy groups, alkoxy groups having 1 to 6 carbon atoms, acyloxy groups, alkenyloxy groups and carboxyl group, and the subscripts a and b are each a positive integer of 1, 2, or 3, with the proviso that a+b is equal to 4;

(C) from 1 to 40 parts by weight of a finely divided silica powder; and (D) a catalytic amount of a platinum compound, which is subjected to a heat treatment at a temperature in the range from 40° to 150° C.

3. The silicone-based antifoam composition as claimed in claim 2 which is in the form of an emulsion in an aqueous medium the emulsion having been subjected to a heat treatment at a temperature in the range from 40° to 90° C.

4. The silicone-based antifoam composition as claimed in claim 2 which is in the form of a dispersion in an organic solvent, the dispersion having been subjected to a heat treatment at a temperature in the range from 40° to 150° C.

5. The silicone-based antifoam composition as claimed in claim 1 wherein the organic group in the components (A-a), (A-b) and (A-c) other than the vinyl groups in the component (A-b) is a monovalent hydrocarbon group free from aliphatic unsaturation.

* * * * *